Jan. 22, 1924.
T. BORNEMANN
1,481,344
REMOVING BROKEN TOOLS FROM BORE HOLES
Filed June 15, 1922
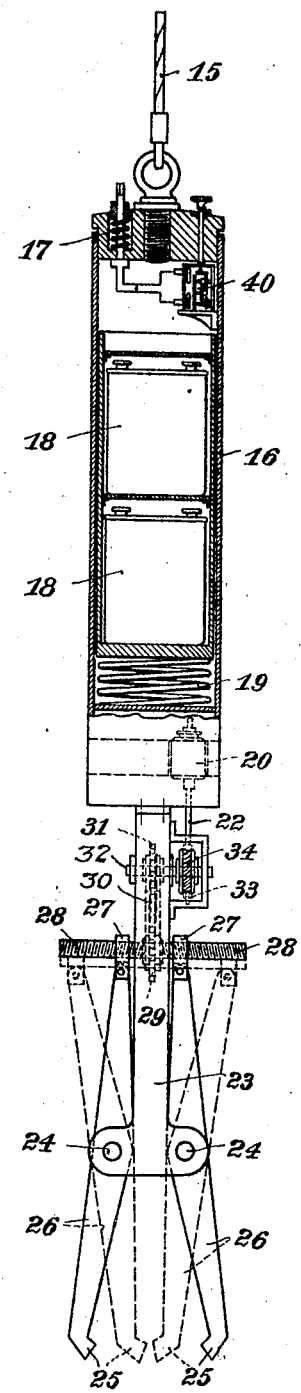
Inventor
Theodor Bornemann
by [signature]
Attorney.

Patented Jan. 22, 1924.

1,481,344

UNITED STATES PATENT OFFICE.

THEODOR BORNEMANN, OF HANOVER, GERMANY.

REMOVING BROKEN TOOLS FROM BORE HOLES.

Application filed June 15, 1922. Serial No. 568,572.

*To all whom it may concern:*

Be it known that I, THEODOR BORNEMANN, a citizen of Germany, residing at Hanover, Germany, have invented certain new and useful Improvements is Removing Broken Tools from Bore Holes, of which the following is a specification.

My invention relates to the art of mining and more especially to a device for clearing bore-holes of broken tools or other iron parts obstructing the hole. In drilling bore-holes it frequently happens that steel or iron parts such as tools or parts thereof get into the hole and must be removed. Sometimes the crowns of drills break off and prevent further drilling.

It has been attempted to extract such iron or steel bodies by means of an electromagnet or of grippers operated by means of an electromotor acting upon them. The supply of electric current to the motor was effected by cables which involves the drawback that the cable was frequently damaged owing to the high velocity at which the motor and the grippers are lowered into the hole and further to the frictional resistance to which the cable is subjected in the hole, damages to the insulation being particularly frequent. Moreover, in connection with lifting devices of the kind aforesaid complicated winches of a special kind were required inasmuch as the cable must have the same tension as the suspension rope. A further difficulty was created by the watertight introduction of the cables to the motor owing to the very high pressure prevailing at the bottom of a bore-hole and which causes moisture to enter the windings of the motor. Finally means for generating current of the required intensity are not always at hand so that often much time was lost in procuring the proper source of electricity.

According to my invention now these drawbacks are obviated by combining a source of electric energy with the motor and the gripping device, thus creating a selfcontained device comprising not only the mechanical gripping means and the motor for operating them but also the source of energy for feeding this motor, the combination as a whole being designed to be lowered into the bore-hole. In consequence thereof the supply cables hitherto required may be dispensed with altogether, the lifting rope, cable or chain carrying the source of energy together with the motor and the grippers.

The improved device according to the present invention is always ready for use, it being only necessary to establish an electric connection between the source of energy which may be a storage battery or a galvanic cell, this being effected, for instance, by means of suitable switches when the device is being lowered into the bore-hole. In a preferred form of my invention the motor and the storage battery or the like are arranged in a common casing or combined in some other way to form a rigid gas-tight structure which moisture cannot enter. Preferably a clockwork or the like is provided near the motor for effecting automatically the electric connection between the motor and the storage battery, such clockwork or the like being so adjusted before lowering the device into the bore-hole, that as soon as the device has reached the obstruction or the bottom of the hole, the motor is supplied with current and on being thus started will close the gripping device or the like by means of suitable gear. On the grippers having gripped the broken tool or the like, the motor which is preferably a series motor with high resistance, is disconnected and stopped automatically and the gripping device with the broken tool, the motor and the storage battery is lifted from the bore-hole. After the bore-hole has been cleared in this manner of the worst obstructions, further obstructions can be removed by aid of a suitable lifting magnet.

In the drawings affixed to this specification and forming part thereof the preferred form of a lifting device embodying my invention is illustrated by way of example diagrammatically in longitudinal section.

Referring to the drawing, 16 is a tubular casing suspended from the rope 15 and having arranged in its upper portion the switching devices 17 and clockwork 40 while in its central portion there are disposed the storage batteries 18 which are preferably protected against axial shocks by a shock absorbing spring 19 or the like. 20 is the electromotor located in the lower portion of the casing 16 and having its armature fixed on a vertical shaft 22 extending downwards. Rails 23 fixed to the lower ends of the casing 16 support the arms 26 of the grippers which are pivoted thereto at 24 and at their lower ends are provided with hooks, points, teeth or the like. The upper ends of the gripper arms carry nuts 27 gearing with a threaded spindle 28 having right and left hand threads and carrying a sprocket wheel 29 adapted to be driven from a sprocket wheel 31 by a chain 30. The shaft 32 of sprocket wheel 31 carries a worm gear 33 which meshes with a worm 34 on the vertical shaft 22 of the motor. After the device has reached the obstruction or the bottom of the bore-hole, the battery circuit is closed by the clockwork or else by some other suitable means and the motor on being started causes the sprocket wheels 31 to 29 to revolve and the spindle 28 to move the nuts 27 with the upper ends of the gripper 26 outwards into the position shown in dotted lines, whereby the lower ends of the grippers are caused to close upon each other and to engage or grip the broken tool or the like between their faces 25.

I wish it to be understood that I do not desire to be limited to the exact details of construction shown and described, for obvious modifications will occur to a person skilled in the art.

I claim:

1. In an electric lifting device for use in bore-holes in combination, mechanical gripping means, an electromotor operatively associated with said gripping means, means for lowering said gripping means and said motor into a bore-hole, and a source of electric energy associated with said electromotor and suspended from said lowering means.

2. In an electric lifting device for use in bore-holes in combination, mechanical gripping means, an electromotor operatively associated with said gripping means, means for lowering said gripping means and said electromotor into a bore-hole and a source of electric energy inserted between said motor and said lowering means.

3. In an electric lifting device for use in bore-holes in combination, mechanical gripping means, an electromotor operatively associated with said gripping means, means for lowering said gripping means and said motor into a bore-hole and an electric battery associated with said electromotor and suspended from said lowering means.

4. In an electric lifting device for use in bore-holes in combination, an electromotor, an electric battery, a casing surrounding said motor and said battery, means attached to one end of said casing for lowering it into a bore-hole and mechanical gripping means fixed to the other end of said casing and operatively connected with said motor.

5. In an electric lifting device for use in bore-holes in combination, mechanical gripping means, an electromotor operatively associated with said gripping means, means for lowering said gripping means and said motor into a bore-hole, an electric battery associated with said electromotor and suspended from said lowering means, and shock absorbing means associated with said battery.

6. In an electric lifting device for use in bore-holes in combination, mechanical gripping means, an electromotor operatively associated with said gripping means, means for lowering said motor and said gripping means into a bore-hole, a source of electric energy associated with said electromotor and suspended from said lowering means and means for automatically starting the supply of current from said source to said motor after they have been lowered into the bore-hole.

7. In an electric lifting device for use in bore-holes in combination, mechanical gripping means, an electromotor operatively associated with said gripping means, means for lowering said motor and said gripping means into a bore-hole, a source of electric energy associated with said electromotor and suspended from said lowering means and means comprising a clockwork for automatically starting after a predetermined time the supply of current from said source to said motor.

8. In an electric lifting device for use in bore-holes in combination, an electromotor, a source of electric energy, a casing surrounding said motor and said source, means attached to one end of the casing for lowering said casing into a bore-hole, a rail extending axially from the other end of said casing, double armed grippers pivoted to said rail, a screw spindle with oppositely threaded ends operatively associated with the upper ends of said grippers and power transmission gearing adapted for transmitting motion from said motor to said spindle.

In testimony whereof I affix my signature.

THEODOR BORNEMANN.